US008770287B2

(12) United States Patent
Pober

(10) Patent No.: US 8,770,287 B2
(45) Date of Patent: Jul. 8, 2014

(54) DEFOAMING AGENT COMPOSITIONS AND METHODS OF MAKING AND USING SAME

(71) Applicant: Halliburton Energy Services, Inc., Houston, TX (US)

(72) Inventor: Kenneth W. Pober, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 24 days.

(21) Appl. No.: 13/653,210

(22) Filed: Oct. 16, 2012

(65) Prior Publication Data

US 2014/0102699 A1  Apr. 17, 2014

(51) Int. Cl.
E21B 21/06 (2006.01)
E21B 21/14 (2006.01)
E21B 43/40 (2006.01)
C09K 8/38 (2006.01)
C09K 8/94 (2006.01)

(52) U.S. Cl.
USPC .......... 166/267; 166/309; 166/308.6; 175/66; 175/69; 507/102; 507/202

(58) Field of Classification Search
None
See application file for complete search history.

(56) References Cited

U.S. PATENT DOCUMENTS

| 4,139,546 | A | 2/1979 | Berger et al. | |
| 4,584,125 | A | 4/1986 | Griswold et al. | |
| 5,403,822 | A | 4/1995 | Mueller et al. | |
| 5,643,721 | A | 7/1997 | Spring et al. | |
| 6,156,808 | A | 12/2000 | Chatterji et al. | |
| 6,297,202 | B1 | 10/2001 | Chatterji et al. | |
| 6,417,142 | B1 | 7/2002 | Chatterji et al. | |
| 6,460,632 | B1 * | 10/2002 | Chatterji et al. | 175/66 |
| 7,077,219 | B1 * | 7/2006 | Chatterji et al. | 175/66 |
| 7,150,322 | B2 | 12/2006 | Szymanski et al. | |
| 7,308,938 | B1 | 12/2007 | Chatterji et al. | |
| 7,517,836 | B2 | 4/2009 | Chatterji et al. | |
| 7,767,628 | B2 | 8/2010 | Kippie et al. | |
| 7,824,489 | B2 | 11/2010 | Szymanski et al. | |
| 7,863,225 | B2 | 1/2011 | Chatterji et al. | |
| 7,926,591 | B2 | 4/2011 | Nguyen et al. | |
| 8,176,981 | B2 * | 5/2012 | Savu et al. | 166/270.2 |
| 2005/0250666 | A1 * | 11/2005 | Gatlin et al. | 510/424 |
| 2010/0044050 | A1 * | 2/2010 | Savu et al. | 166/308.6 |
| 2010/0294501 | A1 | 11/2010 | Daute et al. | |

FOREIGN PATENT DOCUMENTS

EP 0339762 A2 11/1989

OTHER PUBLICATIONS

Foreign communication from a related counterpart application—International Search Report and Written Opinion, PCT/US2013/060351, Dec. 20, 2013, 11 pages.

Filing receipt and specification for patent application entitled "Defoaming Agent Compositions and Methods of Making and Using Same," by Kenneth W. Pober, filed Feb. 28, 2014 as U.S. Appl. No. 14/193,827.

* cited by examiner

Primary Examiner — George Suchfield
(74) Attorney, Agent, or Firm — Craig Roddy; Conley Rose, P.C.

(57) ABSTRACT

A method of servicing a wellbore in a subterranean formation comprising placing a foamed wellbore servicing fluid into a wellbore; flowing the foamed wellbore servicing fluid back to the wellbore surface; and contacting the foamed wellbore servicing fluid with an immobilized defoaming agent structure comprising an inert substrate and a defoamer. A system comprising a foamed wellbore servicing fluid in contact with a de-foaming structure, wherein the de-foaming structure comprises a defoamer covalently bonded to an inert substrate.

22 Claims, 2 Drawing Sheets

DEFOAMING AGENT COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field

This disclosure relates to methods of servicing a wellbore. More specifically, it relates to methods of servicing a wellbore with defoaming agent compositions.

2. Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Many wellbore servicing fluids are foamed to facilitate their use in a wellbore servicing operation. For example, a drilling fluid may be circulated with a gas downwardly through a rotary drill pipe and drill bit connected thereto. As the aqueous solution and gas flows through the drill pipe and drill bit, the drilling fluid is foamed. Well bore cuttings generated by the drill bit are readily lifted to the surface by the foamed solution produced. When the foamed solution containing the cuttings reaches the surface, it is typically defoamed to remove the cuttings and gas. One impediment to the reuse of foamed wellbore servicing fluids is the presence of the defoamer which serves to inhibit the subsequent refoaming of the fluid. Thus, there exists an ongoing need for developing defoamers and/or defoaming strategies that facilitate the reuse of wellbore servicing fluids.

SUMMARY

Disclosed herein is a method of servicing a wellbore in a subterranean formation comprising placing a foamed wellbore servicing fluid into a wellbore; flowing the foamed wellbore servicing fluid back to the wellbore surface; and contacting the foamed wellbore servicing fluid with an immobilized defoaming agent structure comprising an inert substrate and a defoamer.

Also disclosed herein is a system comprising a foamed wellbore servicing fluid in contact with a de-foaming structure, wherein the de-foaming structure comprises a defoamer covalently bonded to an inert substrate.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
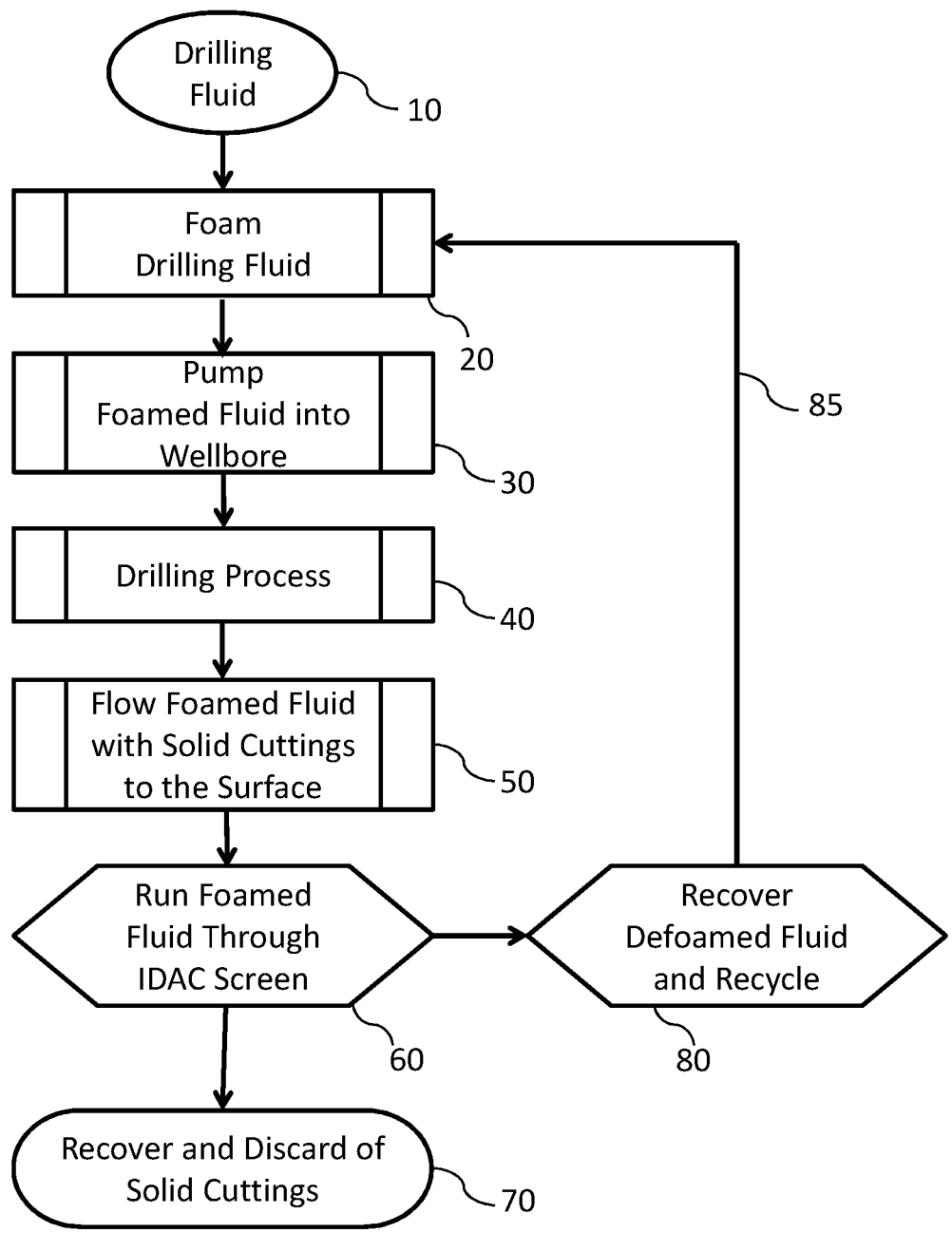
FIG. 1 is a wellbore servicing process flow diagram.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are compositions and structures comprising a defoamer and an inert substrate for use in wellbore servicing operations. In an embodiment the defoamer is associated with the inert substrate such that the defoamer is affixed to or immbolized onto the inert substrate, thereby forming a wellbore servicing fluid treatment structure (e.g., a defoaming structure) such as a functionalized screen. Such compositions (and structures formed thereof) are referred to herein as immobilized defoaming agent compositions (IDAC). In an embodiment, the IDAC is contacted with and defoams any foamed wellbore servicing fluid, thereby forming a system comprising a defoamed wellbore servicing fluid and one or more IDACs (e.g., one or more IDACs disposed within or coupled to one or more wellbore servicing equipment components such as a settling/de-foaming tank). Examples of wellbore servicing fluids that may be contacted with an IDAC of the type disclosed herein include without limitation drilling fluids, fracturing fluids, completion fluids, workover fluids, and stimulation fluids. Hereinafter, the disclosure will refer to the use of the IDAC for defoaming drilling fluids, alternatively water-based drilling foam, although the defoaming of other wellbore servicing fluids of the type disclosed herein is also contemplated.

In an embodiment, the IDAC comprises an inert substrate. In an embodiment, the inert substrate comprises a material that does not modify or otherwise affect the defoaming activity of the defoaming agent and may not react or otherwise affect materials that contact the inert substrate during the course of a wellbore servicing operation. Further, an inert substrate suitable for use in the present disclosure may comprise any material with which the defoamer could be associated. In some embodiments, the defoamer is covalently bound to the surface of the inert substrate. In an embodiment, inert substrates suitable for use in this disclosure comprise an organic polymer, an inorganic material, or combinations thereof. Herein the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials.

In an embodiment, the inert substrate comprises an organic polymer. Organic polymers suitable for use as inert substrates in the present disclosure include without limitation vinyl polymers, olefin polymers, fluoropolymers, polyesters, copolymers thereof, derivatives thereof, or combinations thereof. The term "derivative" is defined herein to include any compound that is made from one or more of the organic polymers, for example, by replacing one atom in the organic polymer with another atom or group of atoms, rearranging two or more atoms in the organic polymer, ionizing the organic polymer, or creating a salt of the organic polymer. The term "copolymer" as used herein is not limited to the combination of two polymers, but includes any combination of polymers, e.g., homopolymers, random, block, graft, terpolymers, star- and hyper-branched polymers, and the like. In an embodiment, the organic polymers may be crosslinked to provide further structural stability.

In an embodiment, vinyl polymers suitable for use in the present disclosure comprise polystyrene, polyvinylchloride, cross-linked polyvinylacetate, cross-linked polyacrylamide, cross-linked methacrylamide, and copolymers, blends, or combinations thereof.

In an embodiment, olefin polymers suitable for use in the present disclosure comprise polyethylene, polypropylene, polybutylene, polybutadiene, polyisoprene, and copolymers, blends, or combinations thereof.

In an embodiment, fluoropolymers suitable for use in the present disclosure comprise polyvinyl fluoride, polytetrafluoroethylene, fluorinated ethylene propylene copolymers, perfluoroalkoxy polymer, perfluoromethylalkoxy polymer, ethylenetetrafluoroethylene, ethylenechlorotrifluoroethylene, polychlorotrifluoroethylene, polyvinylidene fluoride, perfluoro-octene, and copolymers, blends, or combinations thereof.

In an embodiment, polyesters suitable for use in the present disclosure comprise polyethylene terephthalate, polytrimethylene terephthalate, polybutylene terephthalate, polymerized polyethyleneglycol dimethacrylate, and copolymers, blends, or combinations thereof.

In an embodiment, the inert substrate comprises acrylonitrile/butadiene/styrene resins, block copolymers of styrene with either butadiene or isoprene; polysiloxane resins, polyphosphazenes or combinations thereof. For example the inert substrate may comprise a styrene block copolymer such as the KRATON D SBS family of polymers which are styrene butadiene block copolymers commercially available from Kraton Performance Polymers Inc.

In an embodiment, the inert substrate comprises an inorganic material. In an embodiment, an inert substrate suitable for use in the present disclosure comprises silica gel, alumina, metals, or combinations thereofn an embodiment, the inert substrate comprises a gold layer deposited on a metal substrate (e.g., steel alloy). In such an embodiment, the gold may be deposited on the metal by electroplating.

In an embodiment, the inert substrate serves as the support on which a defoamer is disposed, thereby forming a wellbore servicing fluid treatment structure (e.g., a defoaming structure such as a functionalized screen). As such, the inert substrate may be fashioned or assume any geometry or shape to form a structure compatible with some user and/or process goal. Nonlimiting examples of geometry/shapes for the structure that the insert substrate may assume include porous structures, screens, balls, pellets, spheroids, tubes, pipes, flexible sponges, or any combinations thereof.

In an embodiment, the structure formed by the inert substrate is a screen with an aperture size of from about 10 mesh to about 450 mesh, alternatively from about 40 mesh to about 300 mesh, or alternatively from about 200 mesh to about 300 mesh. As used herein, the term "mesh size" is used to refer to the sizing of a particular screen as defined by as "ASTM E-11 Specifications" or "ISO 3310-1". Generally, mesh size may refer approximately to the greatest size of material that will pass through a particular mesh size, for example, the nominal opening. The mesh size may also refer to the inside dimension of each opening in the mesh (e.g., the inside diameter of each square).

In an embodiment, the IDAC comprises a defoamer. The defoamer may comprise any compound that is able to prevent and/or reduce the entrapment of air and/or gas in a mixture with which it is contacted. In an embodiment, the defoamer causes a foam to collapse to a liquid solution. In an embodiment, the defoamer comprises a silicon-containing material, a hydrocarbon, polypropylene glycol, polyethylene glycol, an aliphatic hydrocarbon, glycerol tristearate, amides of a carboxylic acid, ethoxylated or propoxylated fatty alcohols, ethoxylated alcohols, aliphatic alcohols, n-alkyl phosphate esters, or combinations thereof.

In an embodiment, the defoamer comprises a silicon-containing material, alternatively an organosilane-containing material. The organosilane-containing material may comprise a siloxane such as for example a polydialkylsiloxane. A polydialkylsiloxane suitable for use in this disclosure includes without limitation polydimethylsiloxane. Suitable siloxanes that are commercially available for defoamer applications include for example and without limitation RHODORSIL ANTIFOAM 481 defoamer and RHODORSIL ANTIFOAM 416 defoamer which are medium viscosity silicone oils commercially available from Rhodia Corporation, France. Additional disclosure on silicon-containing defoamers is provided in U.S. Pat. Nos. 4,139,546 and 4,584,125, each of which is incorporated by reference herein in its entirety.

In another embodiment, the defoamer comprises a hydrocarbon. For example, the hydrocarbon may comprise an internal olefin. Alternatively, the hydrocarbon may comprise straight-chain n-alcohols, such as 1-hexanol, 1-octanol, 1-decanol, 2-ethylhexanol or combinations thereof. In certain embodiments, the straight-chain n-alcohols include those having between four and ten carbons. Optionally, the hydrocarbon may be used in conjunction with other compounds such as ethylene glycol, propylene glycol, or any combinations thereof. Other suitable defoamer compounds include ester-based fluids, such as PETROFREE LV fluid which is an ester-based fluid commercially available from Halliburton Energy Services, Inc.

In an embodiment, the defoamer comprises polypropylene glycol. In some embodiments, the polypropylene glycol may have a molecular weight in the range of from about 435 daltons (Da) to about 4000 Da, alternatively from about 3000 Da to about 4000 Da, or alternatively from about 3000 Da to about 3100 Da.

In an embodiment, the defoamer comprises a mixture of glycerol tristearate and one or more aliphatic hydrocarbons, for example one or more aliphatic hydrocarbons selected from the group consisting of olefins having one or more internal double bonds and having 14 to 18 carbon atoms and a $C_{10}$ dimer of the formula:

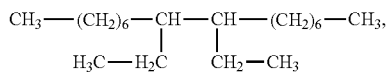

The one or more aliphatic hydrocarbons may comprise a mixture of $C_{16}$ to $C_{18}$ olefins having internal double bonds or a mixture of $C_{14}$ to $C_{16}$ olefins having internal double bonds or a dimer having the formula set forth above. Generally, the weight ratio of the glycerol tristearate to the one or more aliphatic hydrocarbons utilized is in the range of from about 5:95 to about 10:90. Alternatively, the weight ratio of the glycerol tristearate to the one or more aliphatic hydrocarbons is about 8.34:91.66.

In an embodiment, the defoamer comprises amides of carboxylic acids. In some embodiments, the amide of carboxylic acid may include an amide of a carboxylic acid having a carbon chain of from about 8 carbons to about 12 carbons, alternatively from about 9 carbons to about 11 carbons. In an embodiment, the amide of carboxylic acid comprises an amide of nonanoic acid (e.g., isononanoic acid).

In an embodiment, the defoamer comprises ethoxylated and propoxylated fatty alcohols. Those of ordinary skill in the art will appreciate that fatty alcohols generally include aliphatic alcohols derived from natural fats and oils. In an embodiment, the ethoxylated and propoxylated fatty alcohols may include ethoxylated and propoxylated $C_{12-15}$ fatty alcohols (e.g., a mixture of fatty alcohols containing 12 carbons to 15 carbons in various proportions), such as lauryl alcohol and/or 1-tetradecanol. In some embodiments, the ethoxylated and propoxylated fatty alcohols may be substituted with from about 3 moles to about 6 moles (e.g., 4 moles) of ethylene oxide per mole of the fatty alcohol and from about 3 moles to about 6 moles (e.g., 4 moles) of propylene oxide per mole of the fatty alcohol. In such embodiments, substitution of the ethylene oxide is followed by the substitution of the propylene oxide to form an ethylene oxide-propylene oxide block copolymer.

In an embodiment, the defoamer comprises an ethoxylated alcohol having from about 3 carbons to about 6 carbons. Nonlimiting examples of ethoxylated alcohols suitable for use with the present disclosure may include an alcohol (e.g., ethyl, propyl or butyl alcohol) or a combination of various alcohols (e.g., a mixture of propyl and butyl alcohol) that contains from about 3 carbons to about 6 carbons and have been ethoxylated. In an embodiment, the ethoxylated alcohol comprises an ethoxylated propyl alcohol, butyl alcohol, pentyl alcohol, hexyl alcohol, or combinations thereof. In an embodiment, the ethoxylated alcohol comprises n-butyl alcohol. In some embodiments, the ethoxylated alcohol may be substituted with about 3 moles to about 6 moles (e.g., 4 or 5 moles) of ethylene oxide per mole of the ethoxylated alcohol.

In an embodiment, the defoamer comprises n-alkyl phosphate ester, wherein the alkyl chain ranges from about 2 to 10 carbon atoms, alternatively from about 3 to about 8 carbon atoms, or alternatively from about 4 to about 6 carbon atoms. In an embodiment, the defoamer comprises n-butyl phosphate ester.

In an embodiment, the defoamer and inert substrate are each present in amounts effective to perform its intended function. Thus, the amount of defoamer may range from about 1 weight percent (wt. %) to about 100 wt. %, alternatively from about 25 wt. % to about 75 wt. %, or alternatively from about 40 wt. % to about 50 wt. % based on the total weight of the IDAC, while the amount of inert substrate may range from about 0 wt. % to about 99 wt. %, alternatively from about 75 wt. % to about 25 wt. %, or alternatively from about 50 wt. % to about 60 wt. % based on the total weight of the IDAC. In an embodiment, a defoamer of the type disclosed herein is associated with an inert substrate of the type disclosed herein by functionalizing the defoamer, the inert substrate, or both. Without wishing to be limited by theory, "functionalizing" as used herein refers to modifying the chemical structure of the defoamer, the inert substrate, or both to provide a reaction site that would facilitate the formation of a covalent attachment between the defoamer and the inert substrate. Nonlimiting examples of types of covalent bonds that may be formed between the defoamer and the inert substrate include sulfur-metal bonds, ester bonds, amide bonds, C—C bonds, C—O bonds C—N bonds; C—Si bonds or combinations thereof. In some embodiments, the defoamer which is covalently linked to the inert substrate may be further characterized as being stationary with respect to the inert substrate material. It is to be understood that the inert substrate is functionalized in order to facilitate formation of the IDAC. However, the inert substrate when utilized in a wellbore servicing operation can be characterized as being unreactive to the materials that contact the inert substrate.

In an embodiment, the defoamer comprises a thiol (e.g., —SH) group. In such embodiments, the inert substrate may comprise a metal that is able to form a bond with the thiol group. For example, the inert substrate may comprise gold. In an embodiment, the inert substrate comprises a multilayer structure where the gold is deposited/plated (e.g., via electroplating) onto a support layer (e.g., stainless steel). In such embodiments, the IDAC may be formed by immersion of the inert substrate in a solution of a thiol-functionalized defoamer. The defoamer may then form a self-assembled monolayer onto the surface of the inert substrate (e.g., gold plated stainless steel) in a time period of from about 1 min to about 1 day, alternatively about 10 min to about 12 h, or alternatively about 1 h to about 6 h. The resulting IDAC may comprise sulfur-metal bonds (i.e., S—Au covalent bonds).

In an embodiment, the defoamer and inert substrate may be covalently bonded via a condensation reaction. Without wishing to be limited by theory, a condensation reaction is a stepwise reaction in which two or more reactants yield a single main product with accompanying formation of water or of some other small molecule (e.g., ammonia, methanol, ethanol, acetic acid, hydrochloric acid, hydrogen sulfide). Nonlimiting examples of condensation reactions suitable for use with the present disclosure include: a condensation reaction between an amine and a carboxylic acid resulting in amide; an esterification reaction between an alcohol and a carboxylic acid; a Claisen condensation reaction between two ester groups or an ester group and a carbonyl group; a Claisen-Schmidt condensation or aldol condensation between an enolate group and a carbonyl group; a Knoevenagel condensation between a carbonyl group and a group containing an active hydrogen atom (e.g., an acidic hydrogen prone to nucleophilic addition); a Michael addition reaction between a nucleophile and an αβ-unsaturated carbonyl compound; and/or reactions in which a metal complex comprising zinc, copper, cadmium can affect the removal of a chlorine atom from the inert substrate and another chlorine atom from the defoamer, to covalently connect the defoamer and substrate.

In an embodiment, the defoamer comprises a carboxylic acid (e.g., —COOH) group, and the inert substrate comprises an amine group which may be either a primary or a secondary amine. Alternatively, the defoamer comprises an amine group which may be either a primary or a secondary amine, and the inert substrate comprises a carboxylic acid (e.g., —COOH) group. In such embodiments, the IDAC may be formed by contacting the defoamer with the inert substrate under suitable conditions for a condensation reaction to occur between the carboxylic acid and amine groups resulting in the formation of an amide bond.

In an embodiment, the defoamer comprises a carboxylic acid (e.g., —COOH) group, and the inert substrate comprises an alcohol (e.g., —OH) group. Alternatively, the defoamer comprises an alcohol (e.g., —OH) group, and the inert substrate comprises a carboxylic acid (e.g., —COOH) group. In such embodiments, the IDAC may be formed by contacting the defoamer with the inert substrate under suitable conditions for a condensation reaction to occur between the carboxylic acid and alcohol groups resulting in the formation of an ester bond.

In an embodiment, the inert substrate comprises silica, and the defoamer comprises dimethylsiloxane. Silica may be treated at elevated temperatures with a hydrophobicizing agent such as a silicone oil (e.g., poly-dimethylsiloxane). The thermal treatment serves to chemically bond the hydrophobicizing agent (e.g., poly-dimethylsiloxane) to the hydrophilic silica surface. In an embodiment, the silica inert substrate is assembled prior to covalently binding the defoamer to the inert substrate. In a further embodiment, an IDAC comprises dimethylsiloxane bound to silica, wherein the IDAC has a screen or mesh geometry.

In some embodiments the silica may be functionalized with exterior chlorine atoms. The functionalized silica may be subsequently reacted with a defoamer e.g., a hydroxydimethylsiloxane. In another embodiment a suitable chlorosiloxane is reacted exterior hydroxyl groups on silica in a base condensation reaction.

As it may be understood by one of ordinary skill in the art, the geometry of the IDAC structure follows the geometry of the inert substrate, as the defoamer is substantially disposed on the surface of the inert substrate and/or throughout the entirety of the substrate. The manner in which the IDACs are contacted with foamed wellbore servicing fluids may be dependent upon the geometry of the IDAC composition as will be described later in more detail herein.

In an embodiment, the inert substrate comprises a material of the type disclosed herein which is formed into some user and/or process desired shape. For example, the inert substrate comprises an organic polymer which is subjected to a plastics shaping process to form a desired geometry, for example a screen having the features discussed herein. Nonlimiting examples of shaping processes that the organic polymer may be subjected to include compounding, injection molding, compression molding, extrusion, extrusion molding, melt extrusion, thread or filament forming followed by weaving, and the like, or any suitable combination of these methods. Prior and/or subsequent to the formation of an inert substrate having a user and/process desired shape, the surface of the inert substrate may be functionalized and the defoamer covalently bonded to the surface of the inert substrate. In an embodiment, the inert substrate and/or the defoamer are functionalized and covalently bonded, and the resultant material may then be subjected to a shaping process which forms some user and/or process desired shape.

One of ordinary skill in the art with the benefit of this disclosure may (i) choose appropriate combinations of defoamers and inert substrates, (ii) modify (e.g., functionalize) them as appropriate for forming a suitable IDAC, and (iii) form the IDAC into a structure suitable for its intended use, with the understanding that (ii) and (iii) may be reversed or combined in order.

In an embodiment, the IDAC comprises a defoamer that covers from about 5% to about 100% of the surface of the inert substrate, alternatively greater than about 50% of the surface area of the inert substrate, alternatively greater than about 60, 65, 70, 75, 80, 85, 90, or 95% of the surface area of the inert substrate. In an embodiment, the defoamer is disposed on the surface of the inert substrate such that the assembled/shaped IDAC retains greater than about 50% of the defoaming activity associated with an identical amount of defoamer that is not associated with an inert substrate; alternatively greater than about 55, 60, 65, 70, 75, 80, 85, 90, or 95% of the defoaming activity associated with an identical amount of defoamer that is not associated with an inert substrate. Herein the defoaming activity refers to an amount of defoamer required to collapse a set amount of foamed solution.

In an embodiment, the IDAC comprises a thiol-functionalized 2-ethylhexanol compound, and a gold electroplated steel alloy substrate already assembled in the desired geometry (e.g., a screen with apertures of about 100 mesh). In such an embodiment, the gold-plated screen may be immersed in an alcoholic (e.g., ethanolic) solution of the thiol-functionalized 2-ethylhexanol compound that has a concentration in a range of from about 1 mM to about 100 mM. The defoamer and the inert substrate may be contacted for a time period of from about 6 h to about 12 h, thus forming the IDAC.

In an embodiment, the IDAC comprises a di-carboxylic acid-based compound and the inert substrate (e.g., a screen with aperture of about 100 mesh) comprises an organic polymer (e.g., polyvinylalcohol) which may be functionalized with an alcohol (e.g., —OH) group. In such an embodiment, upon contacting the functionalized defoamer with the functionalized inert substrate under suitable conditions for an esterification condensation reaction, an ester bond is formed between the defoamer and the inert substrate, thus forming the IDAC.

In an embodiment, the IDAC comprises silica and silicone oil (e.g., poly-dimethylsiloxane). In such an embodiment, the hydrophilic silica inert substrate may be assembled in the desired geometry (e.g., a screen with apertures of about 100 mesh) by any suitable methodology. In an embodiment, the hydrophilic silica substrate may be hydrophobicized by spraying with a uniform coating of defoamer, followed by heating at 150° C., for a period of time of about 2 hours, thus forming the IDAC.

In an embodiment, the IDAC may be used for defoaming a wellbore servicing fluid (WSF). As used herein, a "servicing fluid" refers to a fluid used to drill, complete, work over, fracture, repair, or in any way prepare a wellbore for the recovery of materials residing in a subterranean formation penetrated by the wellbore. Examples of wellbore servicing fluids (WSFs) include, but are not limited to, drilling fluids or muds, fracturing fluids or completion fluids. The servicing fluid is for use in a wellbore that penetrates a subterranean formation. It is to be understood that "subterranean formation" encompasses both areas below exposed earth and areas below earth covered by water such as ocean or fresh water. In an embodiment, the defoamed servicing fluid may be recycled.

The WSF may further comprise additional additives as deemed appropriate by one of ordinary skill in the art, with the benefit of this disclosure. Additives may be used singularly or in combination. Examples of such additional additives include, but are not limited to, a surfactant, a suspending agent, a crosslinking agent, a breaker, a bridging agent, a weighting agent, and the like, or any combinations thereof. Methods for introducing these additives and their effective amounts are known to one of ordinary skill in the art.

In an embodiment, the WSF comprises a drilling fluid. In an embodiment, the drilling fluid comprises a water-based mud (WBM). In an embodiment, the wellbore servicing fluid comprises a WBM. Herein, a WBM refers to a drilling fluid in which water or saltwater is the predominant component of the liquid phase. In an embodiment, the WBM is an emulsion having aqueous fluid as the external or continuous phase and nonaqueous fluid as the internal or discontinuous phase. In an embodiment, the aqueous fluid component of the WBM generally comprises any suitable aqueous liquid. Examples of suitable aqueous fluids include, but are not limited to, sea water, freshwater, naturally-occurring and artificially-created brines containing organic and/or inorganic dissolved salts, liquids comprising water-miscible organic compounds, and combinations thereof. Examples of suitable brines include, but are not limited to, chloride-based, bromide-based, or formate-based brines containing monovalent and/or polyvalent cations and combinations thereof. Examples of suitable chloride-based brines include, but are not limited to, sodium chloride and calcium chloride. Examples of suitable bromide-based brines include, but are not limited to, sodium bromide, calcium bromide, and zinc bromide. Examples of suitable formate-based brines include, but are not limited to, sodium formate, potassium formate, and cesium formate. In an embodiment, the WBM comprises greater than about 50% aqueous fluid by total weight of fluid, alternatively greater than about 55, 60, 65, 70, 75, 80, 85, or 90%.

In some embodiments, additives may be included in the drilling fluid for improving or changing the properties thereof. Examples of such additives include but are not limited to salts, accelerants, surfactants/foaming agents, set retarders, defoamers, settling prevention agents, weighting materials, dispersants, vitrified shale, formation conditioning agents, or combinations thereof. These additives may be included singularly or in combination. Methods for introducing these additives and their effective amounts are known to one of ordinary skill in the art with the aid of this disclosure.

In an embodiment, the drilling fluid comprises a foaming agent. Nonlimiting examples of foaming agents suitable for use with the methods of this disclosure include betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Examples of foaming agents suitable for use with the methods of this disclosure include without limitation HY-CLEAN(HC-2) agent PEN-5 foaming agent, or AQF-2 foaming agent. HC-2 agent is a surface-active suspending agent, PEN-5 foaming agent is a nonionic foaming agent, and AQF-2 foaming agent is an anionic surfactant and foaming agent all of which are commercially available from Halliburton Energy Services. Foaming additives suitable for use in this disclosure are described in more detail in U.S. Pat. No. 7,926,591, which is incorporated by reference herein in its entirety.

In an embodiment, a method of servicing a wellbore comprises circulating an aqueous drilling fluid and a gas downwardly through a rotary drill pipe and drill bit, whereby a foamed drilling fluid is produced. Alternatively or additionally, in an embodiment, the drilling fluid may be partially or completely foamed at the surface prior to being placed downhole via the drill string and circulated back to the surface. In an embodiment, the IDAC may be used for servicing a wellbore in accordance with the process schematized in FIG. 1.

Referring to FIG. 1, in an embodiment, a drilling fluid 10 is subjected to a partial or complete foaming process 20 and is subsequently pumped into the wellbore 30, where the wellbore servicing operation (e.g., drilling) 40 occurs. In an alternative embodiment, the drilling fluid 10 is partially or completely foamed in situ within the wellbore, for example via co-injection of a gas with the drilling fluid. The foamed drilling fluid contacts wellbore drill cutting dowhole (e.g., adjacent the drill bit at the end of the drill string). The foamed drilling fluid comprising the drill cuttings is flowed back to the surface 50 and is contacted with and run through an IDAC structure of the type described previously herein (i.e., screen) 60. In such an embodiment, the IDAC structure is configured to both defoam the drilling fluid and remove solids from the fluid. The gas is removed, i.e., the foam is collapsed to a solution (e.g., non-foamed composition or slurry/mud), and the drill cuttings are removed 70 (e.g., screened out and recovered). The defoamed drilling fluid is recovered 80 and recycled 85 by being foamed and reused in a wellbore servicing operation. In an embodiment, the recovered defoamed drilling fluid is substantially free of the defoamer agent/component (e.g., contains less than 5, 4, 3, 2, 1, 0.1, 0.01, 0.001, or 0.0001 wt. % defoamer). In an embodiment, additional foaming agent is added to the drilling fluid before it is re-used (e.g., re-foamed and re-circulated downhole) in a wellbore servicing operation.

In an alternative embodiment, the foamed drilling fluid containing wellbore solid particles (e.g., drill cuttings) is subjected to a first structure or process which effects separation of the solid cuttings from the foamed drilling fluid. For example, the foamed drilling fluid may be contacted with a screen sized (e.g., a standard, non-treated screen, shaker box, centrifuge, etc.) to remove drill cuttings. Subsequently, the foamed drilling fluid may be contacted with an IDAC of the type described herein (i.e., an inert substrate having a defoamer covalently attached to the surface of the substrate, for example a functionalized screen) and the gas is removed, i.e., the foam is collapsed to an aqueous solution (e.g., a non-foamed composition or slurry/mud). If there are any solids remaining at this point in the aqueous solution, the drilling fluid may be optionally subjected to additional methods for the removal of solids, for example further screening, filtration, centrifuge, etc. The defoamed drilling fluid may be collected and reused as appropriate.

In an alternative embodiment, a plurality of structures or processes may be disposed in a serial configuration for the removal of both the gas (i.e., de-foaming) and the solids (e.g., drill cuttings) from the foamed drilling fluids. For example, a method of servicing a wellbore may comprise providing a plurality of screens (e.g., combinations of standard, non-functionalized screens and IDAC screens of the type disclosed herein) configured and effective for the removal of solid cuttings from a foamed fluid, configured and effective for the defoaming of a foamed drilling fluid or both. In an embodiment, the resultant defoamed fluid with the solids substantially removed may be collected and reused. The sequence and number of times a foamed drilling fluid may be contacted with an IDAC of the type disclosed herein and subsequently re-used (e.g., re-foamed and re-circulated) may be determined by one of ordinary skill in the art with the benefits of this disclosure.

Figure 2:
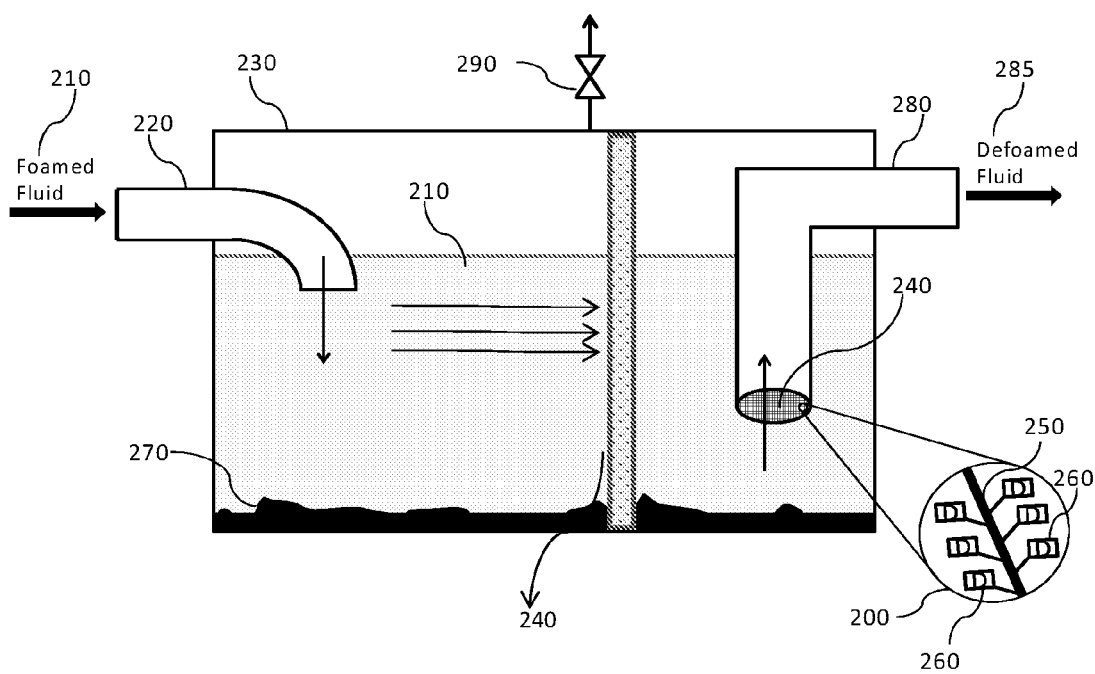
FIG. 2 is a schematic of a defoaming system and related process.

In an embodiment, the drilling foam with cuttings may be subjected to the removal of both the gas (i.e., de-foaming) and the cuttings in an in-line process at the surface of the well, as depicted in a system according to FIG. 2. In an embodiment, the foamed drilling fluid containing wellbore drilling cuttings 210 is pumped through a pipe 220 into a defoaming container 230. The foamed fluid 210 is contacted with an IDAC screen 240. The number and location of the IDAC screens 240 may be varied, for example a first IDAC screen serving as a median or baffle disposed in the body of container 230 and a second IDAC screen covering the inlet to pipe 280 to prevent any carryover solids and/or further de-foam the composition. A magnified section of the IDAC screen 240 is depicted 200. Referring to the magnified section 200, the defoamer 260 is bound to the inert substrate 250. The IDAC screen 240 serves a dual purpose of both removing the solid cuttings 270 and collapsing the foam to a liquid 285, which is removed from the defoaming container 230 through an outlet pipe 280. The defoaming container 230 may have a valve 290 for equalizing any pressure variation (e.g., recapturing gas for reuse and/or disposal) that might be caused by gases released from the foam during the defoaming process. In an embodiment, the continuous (e.g., real-time, steady-state process) removal of both the gas (i.e., de-foaming) and the cuttings through an in-line process (e.g., as described in accordance with the Figures) may be implemented on an offshore drilling platform.

In an embodiment, WSF recovered after the wellbore servicing operation may be defoamed by contact with an IDAC of the type disclosed herein and re-used in a wellbore servicing operation from about 50 to about 200 times. Alternatively, an IDAC of the type disclosed herein may be used in a continuous operation over the time period associated with the drilling operation.

Foamed WSF are often defoamed by placing the foamed fluids in a storage area and allowing the foam to collapse over time. IDAC structures of the type disclosed herein may advantageously provide a reduction and/or elimination of a storage area and time required to defoam a foamed WSF. For example, on an off-shore drilling platform use of the IDAC structures of the type disclosed herein (e.g., continuous in-line process) may reduce the space needed for foamed fluid storage, thereby reducing and/or eliminating the used foam stand-by time. Similarly, the foamed fluid storage space and stand-by time may be reduced and/or eliminated for land-based wellbore servicing operations. Further, IDACs of the type disclosed herein may advantageously facilitate the reuse of the foamed wellbore servicing fluids as the defoamer is not a component of the fluid after defoaming as it remains associated with the inert substrate. This advantageously affords refoaming of the WSF without the inhibitory effects of the presence of a defoamer. Further advantages are realized as the amount of foaming agent needed to achieve some user and/or process desired amount of foaming in the absence of a defoamer is reduced.

The exemplary IDAC disclosed herein may directly or indirectly affect one or more components or pieces of equipment associated with the preparation, delivery, recapture, recycling, reuse, and/or disposal of the disclosed IDAC. For example, the disclosed IDAC may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary IDAC. The disclosed IDAC may also directly or indirectly affect any transport or delivery equipment used to convey the IDAC to a well site or downhole such as, for example, any transport vessels, conduits, pipelines, trucks, tubulars, and/or pipes used to fluidically move the IDAC from one location to another, any pumps, compressors, or motors (e.g., topside or downhole) used to drive the IDAC into motion, any valves or related joints used to regulate the pressure or flow rate of the IDAC, and any sensors (i.e., pressure and temperature), gauges, and/or combinations thereof, and the like. The disclosed IDAC may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The following are additional enumerated embodiments of the concepts disclosed herein.

A first embodiment which is a method of servicing a wellbore in a subterranean formation comprising placing a foamed wellbore servicing fluid into a wellbore; flowing the foamed wellbore servicing fluid back to the wellbore surface; and contacting the foamed wellbore servicing fluid with an immobilized defoaming agent structure comprising an inert substrate and a defoamer.

A second embodiment which is the method of the first embodiment wherein the inert substrate comprises an organic polymer, an inorganic material, or combinations thereof.

A third embodiment which is the method of the second embodiment wherein the organic polymer comprises vinyl polymers, olefin polymers, fluoropolymers, polyesters, copolymers thereof, or combinations thereof.

A fourth embodiment which is the method of the third embodiment wherein the vinyl polymer comprises polystyrene, polyvinylchloride, cross-linked polyvinylacetate, cross-linked polyacrylamide, poly methacrylamide, copolymers, blends, or combinations thereof.

A fifth embodiment which is the method of the third embodiment wherein the olefin polymer comprises polyethylene, polypropylene, polybutylene, polybutadiene, polyisoprene, copolymers, blends, or combinations thereof.

A sixth embodiment which is the method of the third embodiment wherein the fluoropolymer comprises polyvinyl fluoride, polytetrafluoroethylene, fluorinated ethylene propylene copolymers, perfluoroalkoxy polymer, perfluoromethylalkoxy polymer, ethylenetetrafluoroethylene, ethylenechlorotrifluoroethylene, polychlorotrifluoroethylene, polyvinylidene fluoride, perfluoro-octene, copolymers, blends, or combinations thereof.

A seventh embodiment which is the method of the third embodiment wherein the polyester comprises polyethylene terephthalate, polytrimethylene terephthalate, polybutylene terephthalate, polymerized polyethyleneglycol dimethacrylate, copolymers, blends, or combinations thereof.

An eighth embodiment which is the method of the second embodiment wherein the organic polymer comprises acrylonitrile/butadiene/styrene resins, block copolymers of styrene with either butadiene or isoprene; polysiloxane resins, polyphosphazenes, or combinations thereof.

A ninth embodiment which is the method of the third embodiment wherein the inorganic material comprises silica gel, alumina, metals, or combinations thereof.

A tenth embodiment which is the method of any of the first through ninth embodiments wherein the defoamer comprises a silicon-containing material, a hydrocarbon, polypropylene glycol, polyethylene glycol, an aliphatic hydrocarbon, glycerol tristearate, amides of carboxylic acid, ethoxylated fatty alcohols, propoxylated fatty alcohols, ethoxylated alcohols, aliphatic alcohols, n-alkyl phosphate esters, or combinations thereof.

An eleventh embodiment which is the method of any of the first through tenth embodiments wherein the inert substrate, the defoamer, or both are functionalized.

A twelfth embodiment which is the method of any of the first through eleventh embodiments wherein the inert substrate and the defoamer are covalently bonded.

A thirteenth embodiment which is the method of the twelfth embodiment wherein the covalent bond comprises a sulfur-metal t bond, an ester bond, an amide bond, a C—C bond, a C—O bond; a C—N bond; a C—Si bond or combinations thereof.

A fourteenth embodiment which is the method of any of the first through thirteenth embodiments wherein the inert substrate and the defoamer are covalently bonded via a condensation reaction.

A fifteenth embodiment which is the method of the fourteenth embodiment wherein the condensation reaction comprises a condensation reaction between an amine and a carboxylic acid; a condensation reaction between an alcohol and a carboxylic acid; a Claisen condensation reaction; a Claisen-Schmidt condensation reaction; a Knoevenagel condensation reaction; a Michael addition reaction; chloride condensation reaction or combinations thereof.

A sixteenth embodiment which is the method of any of the first through fifteenth embodiments wherein the immobilized defoaming agent structure is a porous structure, a screen; a flexible sponge, or any combinations thereof.

A seventeenth embodiment which is the method of any of the first through sixteenth embodiments wherein the defoamer covers from about 5% to about 100% of the surface of the inert substrate An eighteenth embodiment which is a system comprising a foamed wellbore servicing fluid in contact with a de-foaming structure, wherein the de-foaming structure comprises a defoamer covalently bonded to an inert substrate.

A nineteenth embodiment which is the system of the eighteenth embodiment wherein the defoamer comprises a silicon-containing material, a hydrocarbon, polypropylene glycol, polyethylene glycol, an aliphatic hydrocarbon, glycerol tristearate, amides of carboxylic acid, ethoxylated fatty alcohols, propoxylated fatty alcohols, ethoxylated alcohols, n-alkyl phosphate esters, or combinations thereof and wherein the inert substrate comprises an organic polymer, an inorganic material, or combinations thereof.

A twentieth embodiment which is the system of any of the eighteenth through nineteenth embodiments wherein the wellbore servicing fluid is a drilling fluid and the structure is a screen.

A twenty-first embodiment which is the system of any of the eighteenth through twentieth embodiments further comprising a recovered defoamed wellbore servicing fluid substantially free of the defoamer.

A twenty-second embodiment which is the method of any of the first through seventeenth embodiments further comprising recovering a defoamed wellbore servicing fluid substantially free of the defoamer, re-foaming the recovered wellbore serving fluid, and placing the re-foamed wellbore servicing fluid downhole.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
    placing a foamed wellbore servicing fluid into a wellbore;
    flowing the foamed wellbore servicing fluid back to the wellbore surface; and
    contacting the foamed wellbore servicing fluid with an immobilized defoaming agent structure comprising an inert substrate and a defoamer.

2. The method of claim 1 wherein the inert substrate is an organic polymer, an inorganic material, or combinations thereof.

3. The method of claim 2 wherein the organic polymer is vinyl polymers, olefin polymers, fluoropolymers, polyesters, copolymers thereof, or combinations thereof.

4. The method of claim 3 wherein the vinyl polymer is polystyrene, polyvinylchloride, cross-linked polyvinylacetate, cross-linked polyacrylamide, poly methacrylamide, copolymers, blends, or combinations thereof.

5. The method of claim 3 wherein the olefin polymer is polyethylene, polypropylene, polybutylene, polybutadiene, polyisoprene, copolymers, blends, or combinations thereof.

6. The method of claim 3 wherein the fluoropolymer is polyvinyl fluoride, polytetrafluoroethylene, fluorinated ethylene propylene copolymers, perfluoroalkoxy polymer, perfluoromethylalkoxy polymer, ethylenetetrafluoroethylene, ethylenechlorotrifluoroethylene, polychlorotrifluoro ethylene, polyvinylidene fluoride, perfluoro-octene, copolymers, blends, or combinations thereof.

7. The method of claim 3 wherein the polyester is polyethylene terephthalate, polytrimethylene terephthalate, polybutylene terephthalate, polymerized polyethyleneglycol dimethacrylate, copolymers, blends, or combinations thereof.

8. The method of claim 3 wherein the inorganic material is silica gel, alumina, metals, or combinations thereof.

9. The method of claim 2, wherein the de-foaming structure comprises a defoamer covalently bonded to an inert substrate.

10. The method of claim 9 wherein the defoamer is a silicon-containing material, a hydrocarbon, polypropylene glycol, polyethylene glycol, an aliphatic hydrocarbon, glycerol tristearate, amides of carboxylic acid, ethoxylated fatty alcohols, propoxylated fatty alcohols, ethoxylated alcohols, n-alkyl phosphate esters, or combinations thereof and wherein the inert substrate comprises an organic polymer, an inorganic material, or combinations thereof.

11. The method of claim 10 wherein the wellbore servicing fluid is a drilling fluid and the structure is a screen.

12. The method of claim 11 further comprising recovering a defoamed wellbore servicing fluid substantially free of the defoamer.

13. The method of claim 2 wherein the organic polymer is acrylonitrile/butadiene/styrene resins, block copolymers of styrene with either butadiene or isoprene; polysiloxane resins, polyphosphazenes, or combinations thereof.

14. The method of claim 1 wherein the defoamer is a silicon-containing material, a hydrocarbon, polypropylene glycol, polyethylene glycol, an aliphatic hydrocarbon, glycerol tristearate, amides of carboxylic acid, ethoxylated fatty alcohols, propoxylated fatty alcohols, ethoxylated alcohols, aliphatic alcohols, n-alkyl phosphate esters, or combinations thereof.

15. The method of claim 1 wherein the inert substrate, the defoamer, or both are functionalized.

16. The method of claim 1 wherein the inert substrate and the defoamer are covalently bonded.

17. The method of claim 16 wherein the covalent bond is a sulfur-metal t bond, an ester bond, an amide bond, a C—C bond, a C—O bond; a C—N bond; a C—Si bond or combinations thereof.

18. The method of claim 1 wherein the inert substrate and the defoamer are covalently bonded via a condensation reaction.

19. The method of claim 18 wherein the condensation reaction is a condensation reaction between an amine and a carboxylic acid; a condensation reaction between an alcohol and a carboxylic acid; a Claisen condensation reaction; a Claisen-Schmidt condensation reaction; a Knoevenagel condensation reaction; a Michael addition reaction; chloride condensation reaction or combinations thereof.

20. The method of claim 1 wherein the immobilized defoaming agent structure is a porous structure, a screen; a flexible sponge, or any combinations thereof.

21. The method of claim 1 wherein the defoamer covers from about 5% to about 100% of the surface of the inert substrate.

22. The method of claim 1 further comprising recovering a defoamed wellbore servicing fluid substantially free of the defoamer, re-foaming the recovered wellbore serving fluid, and placing the re-foamed wellbore servicing fluid downhole.

* * * * *